E. W. BRAGUE.
SPIGOT.
APPLICATION FILED JULY 31, 1911.
1,067,583.
Patented July 15, 1913.
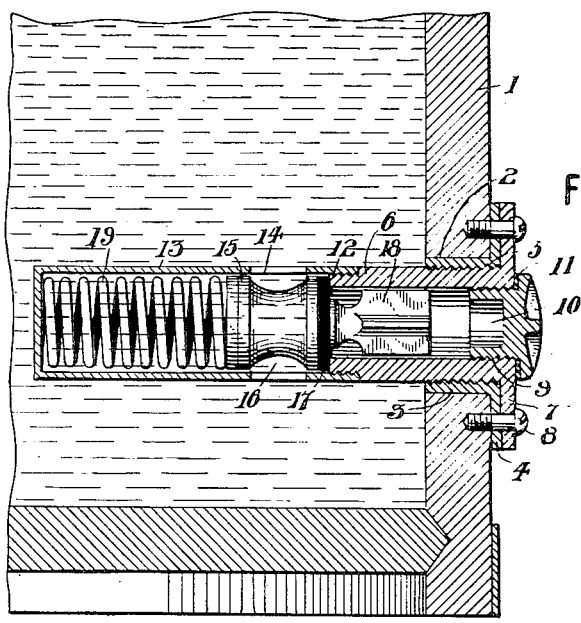
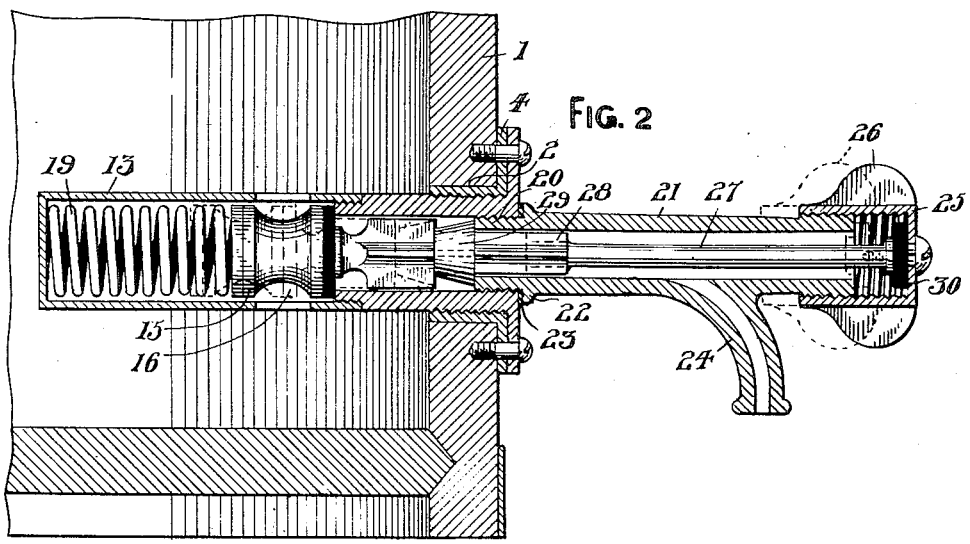
WITNESSES:
J. P. Hefleman
Ralph C. Evert.
INVENTOR.
Everett W. Brague
BY
ATTORNEYS.

UNITED STATES PATENT OFFICE.

EVERETT WESLEY BRAGUE, OF CLARINGTON, OHIO.

SPIGOT.

1,067,583.   Specification of Letters Patent.   Patented July 15, 1913.

Application filed July 31, 1911. Serial No. 641,562.

*To all whom it may concern:*

Be it known that I, EVERETT WESLEY BRAGUE, a citizen of the United States of America, residing at Clarington, in the county of Monroe and State of Ohio, have invented certain new and useful Improvements in Spigots, of which the following is a specification, reference being had therein to the accompanying drawing.

This invention relates to spigots, and more particularly to that type disclosed in Patent 1,024,971 granted April 30, 1912. Besides having the same objects in view as disclosed in my pending application, the present invention aims to relieve the faucet of the strain exerted by the spring pressed valvular member that closes the valve body.

With the above and other objects in view, the invention resides in the novel construction, combination, and arrangement of parts to be hereinafter specifically described and then claimed.

Reference will now be had to the drawing, wherein:

Figure 1 is a longitudinal sectional view of the valve, and Fig. 2 is a similar view showing a spigot or faucet in position.

To put my invention into practice, I provide the wall 1 of a receptacle with an opening 2 adjacent to the bottom of said receptacle. Mounted in this opening is a bushing 3 having at its outer end a peripheral flange 4. The bushing 3 has the inner wall thereof screw-threaded, as at 5, to receive the screw threaded end of a cylindrical valve body 6. The outer end of the valve body has a peripheral flange 7, and this flange and the flange 4 are provided with openings to receive screws 8, or other fastening means employed for screwing the flanges to the wall of the receptacle. The outer end of the valve body 6 is also interiorly screw threaded, as at 9, to receive an exteriorly screw-threaded plug 10 adapted to close the outer end of the valve body. A gasket 11, made of rubber or other resilient material is interposed between the flange 7 and the peripheral edges of the plug 10 to insure a nonleakable connection.

The valve body 6 has the inner end thereof reduced and exteriorly screw-threaded, as at 12, to receive a cylindrical casing 13. This casing has the inner end thereof closed and the end adjacent to said valve body is provided with diametrically opposed oblong openings or slots 14.

Slidably mounted within the casing 13 is a valvular member comprising a head 15, having an annular groove 16. One end of the head has a washer 17 made of rubber or other resilient material, and this washer is adapted to shut off the communication between said valve body and the casing 13.

Connected to the outer end of the head 15 is a spider member 18 assisting in guiding the valvular member, besides affording means to facilitate unseating said valvular member.

Interposed between the inner end of the head 15 and the cylinder 13 is a coiled compression spring 19, adapted to normally retain the valvular member seated against the inner end of the valve body.

To open the valvular member and thereby establish communication between the valve body and the interior of the receptacle, the plug 10 is removed and the nipple 20 of a spigot or faucet 21 is screwed into the outer end of the valve body 6. The nipple 20 has a peripheral flange 22, and interposed between this flange and the flange 7 is a gasket 23 made of rubber or other resilient material. The spigot or faucet 21 has a spout 24 adjacent to the outer end thereof and the outer end is exteriorly screw-threaded to receive a cap 25 having wings 26 to facilitate adjusting said cap. Connected to the cap 25 is the outer end of an actuating rod 27 and the inner end thereof has a guide spider 28 and a knuckle shaped head 29 adapted to engage the member 18. A gasket or washer 30 is used at the connection of the rod 27 and the cap 25 to establish a nonleakable connection. When the cap 25 is adjusted to move inwardly upon the spigot or faucet, the head 29 shifts the member 18 inwardly, thereby unseating the valvular member and placing the spring 19 under tension. The contents of a receptacle can then flow through the valve body 6 and the spigot or faucet 21. When the cap 25 is again adjusted to move the rod 27 outwardly, the valvular member is released and seats against the end of the valve body without exerting any pressure upon the rod 27.

What I claim is:

In combination a valve mechanism comprising a valve adapted to be mounted in a cylindrical receptacle, a casing detachably connected at one end thereof with said valve mechanism and having a depending outlet, a longitudinally extending shiftable valve rod mounted in and of greater length than the length of said casing and provided with an integral guide spider engaging the inner surface of the casing, a knuckle shaped head carried by the inner end of said rod inwardly with respect to the inner end of the casing for limiting the outward movement of said rod and, further for shifting said valve to open position, a screw threaded cap adjustably mounted upon and projecting from the outer end of the casing, means for connecting the outer end of said rod to said cap, and a gasket positioned at the point of connection between the rod and the cap for forming a non-leakable connection.

In testimony whereof I affix my signature in the presence of two witnesses.

EVERETT WESLEY BRAGUE.

Witnesses:
MAX H. SROLOVITZ,
H. M. SMITH.